Dec. 19, 1961  K. OSTERHAMMEL ETAL  3,014,156
ARRANGEMENT FOR IRRADIATION WITH ULTRAVIOLET RAYS
Filed March 2, 1959  2 Sheets-Sheet 1
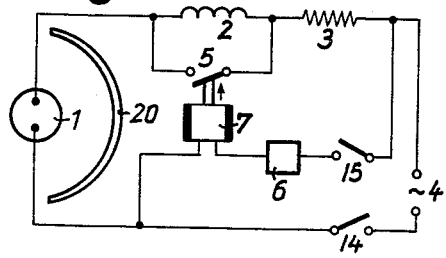
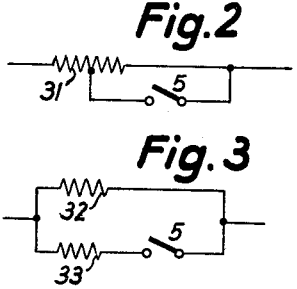
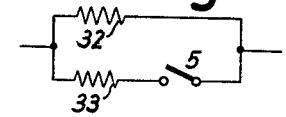
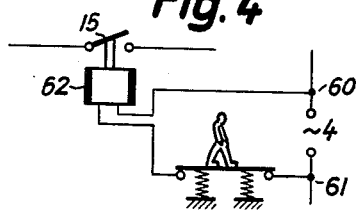
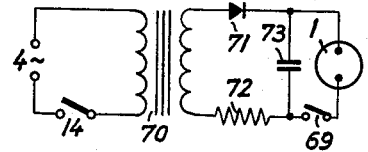
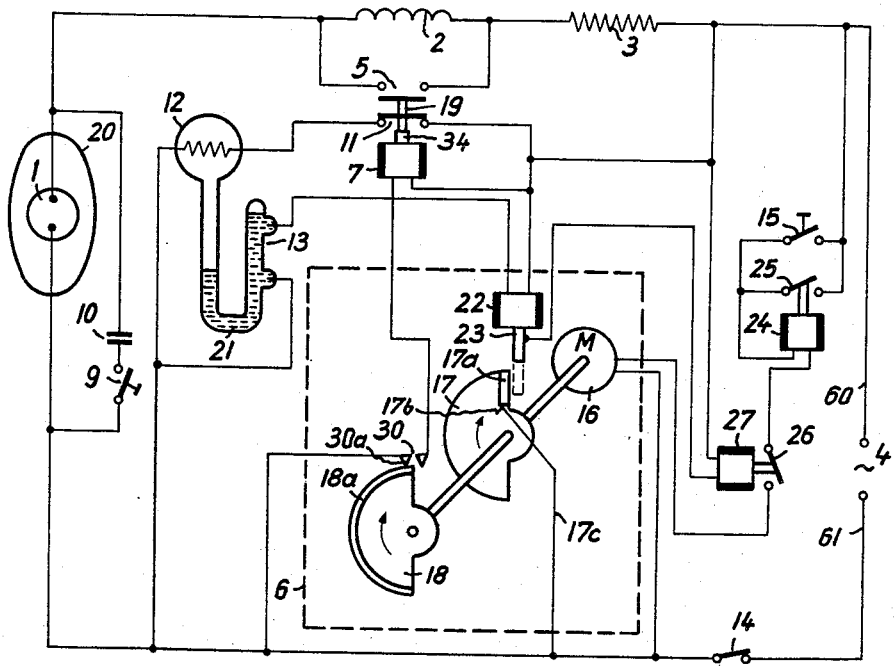
Inventors
KURT OSTERHAMMEL
HELMUT WEISSBROD
By Toulmin & Toulmin
Attorneys

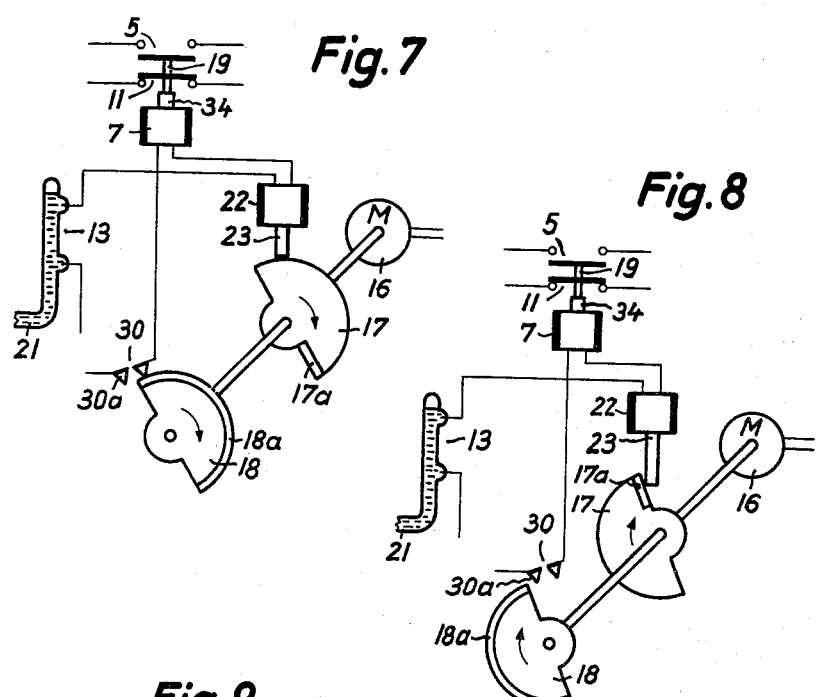
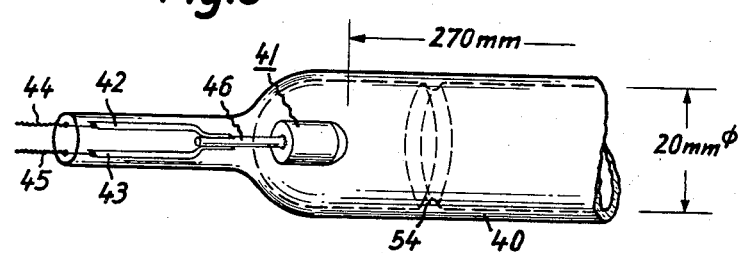
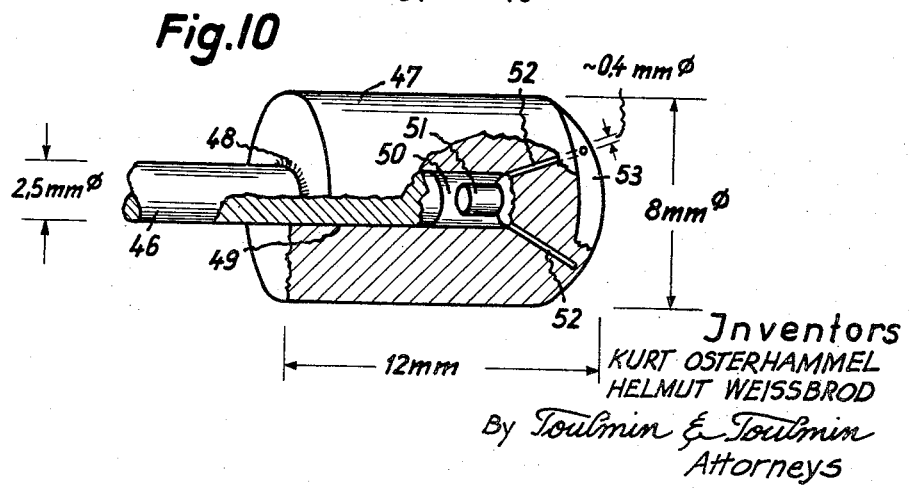

3,014,156
ARRANGEMENT FOR IRRADIATION WITH ULTRAVIOLET RAYS

Kurt Osterhammel, 29 Hauptstrasse, Bruchkobel (Hanau), Germany, and Helmut Weissbrod, 9 Im Schlosshof, Hanau (Main), Germany
Filed Mar. 2, 1959, Ser. No. 796,459
Claims priority, application Germany Mar. 1, 1958
10 Claims. (Cl. 315—224)

This invention relates to an arrangement for irradiation with ultraviolet rays.

It is an object of our invention to provide an electrical arrangement which permits to exactly control the irradiation treatment of humans and ultraviolet light with regard to the applied dose of ultraviolet radiation, and thereby to shorten considerably the entire time of treatment of individual person compared with the time required in the past.

It is another object of the invention to provide a method for treating a person with ultraviolet rays, and to provide a corresponding electrical arrangement which permits to exclude all uncontrolled irradiation before and after the proper treatment, and whereby the dose of rays received by the treated person during the treating period itself can be controlled accurately.

The hitherto known ultraviolet irradiating apparatus which operate preferably with mercury high pressure quartz tubes, generate at the distance from the tube which is the most practical for treating a person, an irradiation intensity of about 600 microwatts per square centimeter in the ultraviolet range. This means, however, that a person having a skin of normal sensitivity will show a weak erythema after an irradiation time of approximately one minute. An increase of the irradiation intensity by correspondingly augmenting the emission of the ultraviolet ray source has not been used and cannot be recommended because this would require a shortening of the treatment periods which could no longer be effectively controlled in practice.

It must also be taken into account that in the increase of a series of treatments with ultraviolet rays, a strengthening of the horny layer of the skin leads to a continuation decrease of the sensitiveness of the skin so that after a regularly repeated series of treatments, the irradiation time may have to be extended from 6 to 10 minutes in order to attain the same effect as that, for instance, a one minute treatment at the beginning of the series. This is particularly disadvantageous if a large number of persons has to be treated in a group such as may be the case in industrial plants, mines, etc., in all of these group treatments an unduly long treatment period per individual person makes the entire treatment extremely uneconomical.

These disadvantages are avoided and the above-mentioned objects are obtained by the method and the electrical arrangement according to our invention which permit to increase the irradiation intensity at the conventional treatment of about 50 centimeters to one meter from the ultraviolet ray source and for the ultraviolet band, from the conventional intensities in the order of 600 micro-w./cm.$^2$ to at least about 300 micro-w./cm.$^2$ and higher, particularly, for example, 6000 to 15,000 micro-w./cm.$^2$. This requires, however, extremely short periods of treatment which can only be very inaccurately controlled by the person carrying out the irradiation on himself or on another person. Therefore, it is a main feature of the arrangement according to the invention that it comprises a time controlled unit which automatically determines the irradiating time and permits to apply electrical load to the radiation source at the desired full intensity of treatment, only for a predetermined short time.

It is possible to use as radiation source for ultraviolet rays, mercury high pressure lamps or noble gas-filled tubes, such as xenon-filled tubes, which will be discussed in more detail further below.

A mercury high pressure tube cannot be operated with individual load pulses of short discharged times since the formation of a sufficiently high mercury vapor pressure in the tube cannot be effected rapidly enough. According to a preferred embodiment of the arrangement according to our invention, a mercury high pressure lamp is, therefore, operated continuously at a relatively low permanent load which is, however, sufficiently high to maintain in the interior mercury of the discharge tube a vapor pressure of at least one atmosphere. The necessary high intensity treatment emission required for very short times whenever a person is to be given the desired high dose of radiation, is then produced by increasing for that short determined period the load of the mercury lamp, for instance, by short circuiting a part of a resistance connected in series with the lamp or by other means to be discussed hereinafter. Each time a new person is placed at the above-mentioned treatment distance, the operating load of the mercury lamp is thus increased, and the time of the increase is automatically controlled whereupon the load drops again to the lower permanent operational load.

This method of operating the irradiating arrangement with a constant basic operational load offers the advantage that due to the extraordinary high load of the discharge tube during the actual treatment periods, the emission yield rate is much more favorable than when operating the lamp with the conventional permanent loads. On the other hand, since the discharge flashes are intermittent with longer pauses during which the tube is only operated at the basic load, the discharge tube need not be electrically and mechanically dimensioned for the high radiation intensities of several thousand watts per centimeter mentioned above, since in the aforesaid intervals between two flashes there is time for the necessary heat exchange between the gaseous medium in the tube, the walls of the latter and the surrounding atmosphere.

The invention will be better understood from the further description thereof in connection with the accompanying drawings in which FIGURE 1 shows a wiring diagram of a simple arrangement according to the invention, comprising a mercury high pressure tube and the necessary series resistance means;

FIGURE 2 shows a slightly different wiring of the series resistance means in the arrangement shown in FIGURE 1;

FIGURE 3 shows another different wiring of the series resistance means in the arrangement shown in FIGURE 1;

FIGURE 4 shows a special arrangement for actuating the treatment starting switch in an arrangement according to the invention;

FIGURE 5 shows another electrical arrangement comprising a source of ultraviolet light and adapted for carrying out the method according to the invention;

FIGURE 6 shows a detailed wiring diagram of a preferred embodiment of the arrangement shown in FIGURE 1;

FIGURES 7 and 8 show different operational positions of part of the system illustrated in FIGURE 6;

FIGURE 9 is a partial lateral view in perspective of an ultraviolet ray emitting source according to the invention; and FIGURE 10 illustrates in partially sectional, perspective view the electrode means according to the invention used in the ultraviolet rays emitting source shown in FIGURE 9.

The wiring diagram of an arrangement according to the invention shown in FIGURE 1, comprises as the source of ultraviolet radiation a discharge tube 1 which is connected in series with a resistor or inductor 2, and an ohmic resistor 3 to a voltage source 4 of alternating current. The resistances of inductor 2 and resistor 3 taken together must be so electrically dimensioned that the discharge tube 1 receives a desired lowest basic load. Flashes of high intensity ultraviolet radiation are produced in tube 1 by short circuiting inductor 2 via an automatic circuit make and break contactor 5 for short times in the order of 0.5 to 10 seconds. The current flowing through tube 1 during these brief times will then depend exclusively on ohmic resistor 3, and the resistance of the lines which usually can not be neglected. These last mentioned resistances must be kept low enough to permit the flow of correspondingly high currents to obtain the above-mentioned radiation intensities of several thousand microw./cm.$^2$.

Instead of using a series of connection of inductor 2 and resistor 3 as shown in FIGURE 1, it is also possible to use a single ohmic resistor 31 as illustrated in FIGURE 2, a determined part of which can be short circuited by contactor 5 during the time of operating tube 1 at flashy intensities. The higher flash load of tube 1 can also be attained by switching into a parallel circuit to ohmic resistor 32 which corresponds to resistor 3 in FIGURE 1, a small high load supporting resistor 33 by closing contactor 5 as illustrated in FIGURE 3.

As is further shown in FIGURES 1 and 6, contactor 5 is so arranged that it can close during a predetermined adjustable time interval and at the beginning of making contact can be effected mechanically or by an auxiliary current as will be explained further below in connection with FIGURE 6. The length of time during which contactor 5 closes is controlled by a time device 6 which effects by a relay 7 the actuation of contactor 5. In order to prevent an excessively rapid succession of flash periods, the contactor 5 is preferably provided with a lock-out device which will permit its revaluation only after a delay of several seconds usually in the order of 10 seconds or more. This will provide sufficient time, for instance, for a treated person to step away from the treating apparatus and for another person to take his place.

FIGURE 1 further shows a main switch 14 which must be closed before the apparatus is ready for operation and a conventional reflector 20 behind the source of ultraviolet light. FIGURES 6 to 8 illustrate in a detailed wiring diagram a preferred embodiment of the arrangement shown in FIGURE 1. In these figures as well as in FIGURES 1 to 5, like reference numerals indicate like parts. When the apparatus is to be made ready for operation main switch 14 is closed. Thereby, the basic permanent load is applied at the electrodes of discharge tube 1. By depressing contactor key 9, a current rush or pulse is generated by means of capacitor 10 which ignites the discharge in tube 1. Discharge tube 1 now operates under the permanent load of, for instance, 700 watts.

A person to be treated can now step in front of tube 1 when receiving any critical irradiation from reflector 20. At the same time during this basic operation, the double contact bridge 19 is in rest or basic position, since relay coil 7 is deenergized, i.e. bridge 19 closes the gap of contactor 11 while contactor 5 is interrupted. Due to the fact that contactor 11 is closed currents flow through the heating coil of a gas relay 12 and heats the gas volume in the latter, whereby the mercury in the right hand leg (6) of the U-tube 21 of gas relay 12 rises and closes the gap between the poles of contact 13. When this occurs, relay coil 22 is energized and attracts armature 23 which is insulated against current flow from coil 22, and which when raised unblocks rotation at movement of disc 17. This disc 17 is mounted on or gear connected to the shaft of a motor 16 and consists of insulating material except for a contact pole piece 17a of electrically conductive materials, such as brass or copper. Contact piece 17a is connected via slight contact means 17b and lead 17c to the voltage source 4. As long as armature 23 is unattracted by coil 22 and, therefore, in block position and in contact with pole piece 17a of disc 17 current will flow through relay coil 27 and cause contact armature 26 to break circuit.

A second contact disc 18 is mounted on the same shaft as disc 17 for rotation in unison therewith; this disc 18 is, for instance, built as a cam disc of insulating material bearing a peripheral contact lining 18a of electrically conductive material extending over the cam operation of disc 18. Of course, disc 18 may also be of circular shape with electrically conductive material covering a track partially about the disc circumference.

As soon as a person to be treated has stepped in front of tube 1, he or another operator may depress contactor key 15 briefly so that lamp 1 will effect an exactly dosed full irradiation. By closing of contact key 15, current flows through the motor 16 which begins to run and rotates discs 17 and 18 in the direction indicated by arrows in FIGURES 6 to 8. At the same time holding relay coil 24 is energized and attracts its armature, thereby closing contact 25 and maintaining current flows through motor 16 although key 15 has been released again. It must be borne in mind that the preceding attraction of armature 23 by relay coil 22 has interrupted current flows through relay 27 so that contact 26 is now in rest position and makes contact. Due to the rotation of disc 18 contact cam 18a of the latter now closes the gap between the poles of contact 30 shortly after the motor 16 has started, and relay 7 becomes energized. The latter now moves armature 34 and the double contact bridge 19 mounted thereon in such a manner that contact 11 is interrupted, and contactor 5 closes. Closing of contactor 5, however, bridges inductor 2 and tube 1 receives a pulse of the full load, for instance, of 7000 watts. At the same time, due to the interruption of contact 11, the heating coil of gas relay 12 cools, the mercury drops in the right hand leg U-tube 21 and contact 13 is interrupted; interruption of this contact deenergizes relay coil 22 and contact armature 23 is dropped downwardly as illustrated in FIGURE 7, sliding at the peripheral surface of the insulating material of disc 17. Discs 17 and 18 rotate further via the position shown in FIGURE 7 at which disc 18 interrupts contact 30 and further until the position shown in FIGURE 8 to be explained further below.

Upon interruption of contact 30, relay 7 becomes deenergized and armature 34 and the double contact bridge 19 return to the position shown in FIGURE 6, whereby contactor 5 is again interrupted promptly and tube 1 returns to the lower basic permanent load. The full irradiation treatment of the before mentioned person is now terminated. The duration of full treatment is determined by the length of the arc formed by the electrically conductive part 18a of disc 18. This duration of treatment can easily be changed by exchanging disc 18 against another having a track 18a of different length.

Due to contact 11 being closed again, there begins a slow reheating of gas-filled relay 12. The size of the gas volume and the heating effect of the heating coil of this relay must be so chosen that still prior to the closing of contact 13 by the gradually receiving level of mercury in the right-hand leg of U-tube 21, discs 17 and 18 have reached the position illustrated in FIGURE 8. In this position contact is made between the pole piece 17a of piece 17 and the electrically conductive end of armature 23 which is connected to voltage via relay coil 27. In the position shown in FIGURE 8, current therefore flows through the contact between 17a and 23 and energizes relay coil 27, whereby the rest contact established by contactor 26 is interrupted. Consequently, coil 24 is deenergized, the contactor 25 is interrupted and motor 16 comes to a standstill. Shortly thereafter the rising mercury in the right-hand leg of U-tube 21 closes contact 13, coil 22 is again energized and attracts armature 23. Hereby contact between the latter and contact piece 17a is interrupted, coil 27 is deenergized and contactor 26 returns to rest position making circuit.

Motor 16 whose current supply is now interrupted by opened contacts 15 and 25 can be set in operation again by a new depression of contact key 15, for instance, by the next person to be treated.

In the following table there are illustrated by way of example only a number of data for the different parts of the embodiment of the invention shown in FIGURE 6. It will be understood that these data are not to be considered in any way as limitative of the scope of the invention.

TABLE OF PARTS

| | |
|---|---|
| Voltage source 4 | 380 volts A.C. |
| Voltage at electrodes of tube 1 (mercury high pressure tube in operation) | 220 volts. |
| Length of track 18a corresponding to | 5 seconds. |
| Speed of discs 17 and 18 | 4 revolutions per minute. |
| Placing of contact piece 17a relative to track 18a | less than 1 second before track 18a contacts pole 30a of contact 30. |
| Gas relay 12 | so dimensioned that contact 13 is reclosed after less than 15 seconds after start of motor 16 (1 revolution of discs 17 and 18 requiring 15 seconds). |
| Capacitor 10 | 2 microfarads. |

Before further explaining the operation of the above dimensioned embodiment of the arrangement according to the invention, there will now be explained the structure of the discharge tube according to the invention used in the aforesaid arrangement. FIGURES 9 and 10 illustrate this discharge tube in detail. The same comprises a cylindrical tube 40 made of quartz glass and closes by melting its end. Near each end of the tube interior there is housed an electrode assembly 41. Current leads-in to this electrode are melted in each end of the tube and comprise two foils 42 and 43 of molybdenum metal melted in the solid quartz end to which molybdenum cables 44 and 45 are welded. The foils 32 and 43 may, for instance, have a length of 25 millimeters (mm.) a width of 5 mm. and a thickness of 15 to 20 microns. The ends of these foils directed toward the tube interior are welded to an electrode pin 46 of tungsten metal. The free end of this pin 46 protrudes into a blind bore 49 which is axially provided in an electrode head 47. This head 47 forms the proper electrode which is heated by the discharge in the interior of tube 40. Electrode head 47 consists of sintered tungsten having an admixture of from preferably 1.8 to 5 percent by weight of thorium dioxide, and is welded at 48 onto electrode pin 46. Pin 46 does not fill bore 49 completely but leaves an empty space 50 in which there is placed, for instance, a helically wound sheet of thorium metal. From the hollow space 50, a plurality of narrow channels 52, for instance, two or four of them each having a diameter of a few tenths of a millimeter lead to the curved front surface 53 of the electrode head 47 through which they open into the tube interior.

An electrode of this type is well-suited for high instantaneous loads and extraordinarily resistant to the same. The thorium metal sheet in connection with the above-mentioned admixture of thorium dioxide to the body of the electrode head provides for specially good emission properties of this electrode according to the invention. During the emission, thorium atoms pass from the incandescent thorium sheet 51 through the channels 52 to the front surface 53 of electrode head 47 where the discharge arc in the interior of tube 40 sets in.

It is preferred to use a mercury high pressure filling for producing the discharge. For this purpose, tube 40 is first evacuated and then filled with a basic filling of a noble gas, for instance, argon of a partial pressure of about 8 millimeters (mm.) of mercury, and a small amount of mercury is introduced which evaporates during the operation of the tube so as to form a mercury vapor pressure of about 760 mm. of mercury (1 atmosphere). These pressure data are only mentioned by way of example, and may be varied within relatively wide limits, for instance, between ½ atmosphere and 5 atmospheres.

In another embodiment of the discharge tube according to the invention, the mercury vapor filling is replaced by a filling with xenon of about two atmospheres operational pressure.

The following dimensioned data have built a mercury discharge tube according to the invention, and are also given by way of example only and not to be considered as limitative. Thus, the quartz tube may have an internal diameter of 20 and an outer diameter of 23 mm., and the distance between the electrodes may be 270 to 300 mm. In this case, the mercury filling may amount to 50 to 70 milligrams. Due to the pair of molybdenum foil leads-in, it is possible to introduce a high intensity current in the order of, for instance, 30 to 35 amperes into the tube. When operating with the above-mentioned voltage source of 380 volts A.C., the above-mentioned terminal voltage of 220 volts will prevail at the electrodes of the tube. During the permanent operation under basic load, the series connected resistance means are so chosen or adjusted that the tube is under a load of 700 watts at an operating current of about 3.5 amperes. In the tube having the above-mentioned mechanical and electrical dimensions, the basic operative load should preferably not drop below the aforementioned 700 watts, since, otherwise, there will be the danger of condensation of mercury in the tube. However, in order to be able to guarantee a controllable maximum radiation output of the tube, it is imperative that all mercury be present in the vapor phase when a radiation flash is released.

During the flash operation effected by the controlled means as described in detail hereinbefore, the load in the tube may be raised from the aforesaid 700 watts to, for instance, a flash load of 6,500 watts at an operative current of 32 amperes. Although this flash load is only a little more than nine times the basic load, the emission rate of ultraviolet rays increases about fifty times so that the emission yield rate becomes considerably more favorable. In the specific example described above, the specific load per square centimeter of discharge tube surface is 3.2 watts/cm.$^2$ during basic load and 30 watts/cm.$^2$ during flash load.

If the above described tube were operated by a conventional method, its specific load would amount to approximately 5 watts/cm.$^2$. A discharge tube of the described type can be operated, for instance, to give flashes of full load of 4 seconds duration interrupted by periods of about 10 seconds of basic load operation so that calculated over a longer period, the load would amount to about 2 kilowatts. This ultraviolet source according to the invention, when combined with a suitable reflector of known construction can evenly illuminate an area of 60 centimeters at a distance of 75 centimeters, and a weak erythema can be caused on the skin of most persons during an irradiation period of 1 second.

It is an important feature of the massive tungsten electrodes according to the invention, that they support, on the one hand, the high currents in the order of 30 to 35 amperes (at the given dimensions) and, on the other hand, that they guarantee a sufficient emission for maintaining the discharge even at the low basic load of, for instance, 700 watts, and the correspondingly low current of, for instance, 3½ amperes.

Any material evaporating from the electrode 41 will be retained behind stop rings, such as annular protrusion 54 provided, for instance, at a distance of 15 mm. from the front side of electrodes toward the interior of tube 40 in the wall of the latter. Thereby, the wall of the tube remains perfectly clear even at the prolonged life time of the tube.

It is also possible to use similar discharge tubes which are built for basic loads and flash loads in about the same ratios as in the above described example.

Such a tube may have a distance between the electrodes of 35 mm. and an outer diameter of 13.5 mm. It may be operated at a basic load of 80 watts and sustained flash loads of about 900 watts. The conventional operational load supported by a known tube of the last mentioned dimensions would be at 180 watts. In the tube according to the invention, it is, therefore, possible to operate at a basic load which is far below the conventionally permissible permanent load. It is only necessary to keep the basic load high enough so as to maintain in the interior of the tube its normal operational pressure. In the last mentioned example, the intensity of ultraviolet radiation increases during the flash load to about 20 to 30 times the intensity during basic load although the output of the tube is only increased 11 times.

The method of operating an ultraviolet light source for the irradiation of humans according to the invention, may also be realized with the aid of a different electrical arrangement, of which an embodiment is illustrated in FIGURE 5. Instead of short circuiting part of a series connected resistor as in the preceding arrangement, the flash load can also be attained by discharging a capacitor via the ultraviolet lamp, which capacitor is being recharged by means of a special charging unit in the interval between two flash periods. This arrangement is particularly suited for use in xenon and other noble gas-filled high pressure discharge tubes, since these do not require a permanent load but can be operated exclusively by the capacitor discharge. In this case, there is no need for a time-setting switch since the energy emitted during the flash is determined by the load voltage and the capacitance.

At a capacitance of, for instance, 100 microfarads, load voltages in the order of 10,000 to 20,000 volts are required.

The wiring diagram illustrated in FIGURE 5 comprises a primary circuit from voltage source 4 via main switch 14 and the primary windings of transformer 70; and the secondary circuit comprising the secondary windings of transformer 70 which are led out, for instance, for the above-mentioned 10,000 to 20,000 volts, a limiting resistor 72, for instance, of 1,000 ohms, a rectifier 71 consisting, for instance of a column of selenium rectifiers of known construction, and a capacitor 73, preferably of 50 to 200 microfarads. Parallel to capacitor 73 there is connected the ultraviolet ray tube 1 via an actuating switch 69.

Upon closing main switch 14, capacitor 73 is charged with the peak voltage from the secondary windings of transformer 70, while switch 69 remains interrupted during the charging time of capacitor 73. In order to release the flash, switch 69 is closed and capacitor 73 discharges in a current flash through tube 1. The dose of irradiation can be varied by altering either the capacitance value of capacitor 73, or, which is mostly preferred in practice, by changing the transformation ratio of transformer 70.

It will be understood that this invention is susceptible to modification in order to adapt it to different usages and conditions and, accordingly, it is desired to comprehend such modifications within this invention as may fall within the scope of the appended claims.

We claim:
1. An apparatus for therapeutic treatment for persons by effecting ultraviolet irradiations with a source of ultraviolet rays comprising means for electrically loading a high pressure emittor of ultraviolet rays for a time ranging from about 0.5 to about 10 seconds to such a degree that an irradiation intensity of at least 3000 microwatts per square centimeter of irradiated area is produced at a conventional distance between 0.5 and 1 meter from the emittor, and means for automatically controlling the total dose of irradiation under this high load.

2. An apparatus for effecting ultraviolet irradiations comprising a source of ultraviolet rays including means for establishing an electrical discharge in a high pressure mercury vapor atmosphere, a basic load electrically connected to said source, and means for intermittently at random intervals increasing the basic load by a flash load from about the 8 fold to the 20 fold of the basic load for a brief time ranging from about 0.5 to about 10 seconds, so that the intensity of irradiation is increased to at least 3000 microwatts and up to several thousand microwatts per square centimeter of illuminated area at a conventional distance of from about 0.5 to 1 meter from the discharge, and means for automatically presetting the time of said flash load so as to accurately control the total dose of irradiation under this load.

3. An arrangement for effecting irradiations with ultraviolet rays, comprising, in combination, in a main circuit, a source of voltage potential, an ultraviolet light-emitting gas-filled high pressure discharge tube, at least one resistor means connected in series thereto, means for short circuiting part of said resistor means for a time interval in the range of about .5 and 10 seconds, whereby the load is raised up to about 8 to 20 times the basic load automatic controlling means connected in parallel to said resistor means, tube, and short-circuiting means and engaging the latter electromechanically for automatically controlling the duration of the actuation of said short circuiting means; and lock-out means for blocking said automatic controlling means so that after the ending of a flash load, the next following flash load can only be initiated after a time interval of at least about twice the duration of said flash load have elapsed.

4. An electrical discharge tube for the emission of ultraviolet rays, comprising a quartz glass hull melted closed at opposite ends of the hull, a gaseous filling in the interior of the hull being under a pressure higher than atmospheric when the tube is in operation, two electrodes spaced apart from each other for the formation of a discharge arc therebetween during operation of the tube, each of said electrodes being located near one of said opposite melted ends, lead-in means melted into each of said ends for connection of said electrode to the outside of the tube, said electrode comprising an electrode head consisting of sintered tungten metal containing from about 1.8 to 5 percent by weight of thorium dioxide.

5. An electrical discharge tube for the emission of ultraviolet rays, comprising a quartz glass hull melted closed at opposite ends of the hull, a gaseous filling in the interior of the hull being under a pressure higher than atmospheric when the tube is in operation, two electrodes spaced apart from each other for the formation of a discharge arc therebetween during operation of the tube, each of said electrodes being located near one of said opposite melted ends, lead-in means melted into each of said ends for connection of said electrode to the outside of the tube, said electrode comprising an electrode bearing pin of tungsten metal, an electrode head consisting of sintered tungsten metal containing from about 1.8 to 5 percent by weight of thorium dioxide, said electrode head being well connected to said pin and having a central blind bore, said pin being inserted in said bore so as to leave a free chamber therein, a sheet of thorium metal placed in said chamber, and channel means leading from said chamber to that portion of the surface of said electrode head at which said discharge arc sets in.

6. An electrical discharge tube for the emission of ultraviolet rays, comprising a quartz glass hull melted closed at opposite ends of the hull, a gaseous filling in the interior of the hull being under a pressure higher than atmospheric when the tube is in operation, two electrodes spaced apart from each other for the formation of a discharge arc therebetween during operation of the tube, each of said electrodes being located near one of said opposite melted ends, lead-in means melted into each of said ends for connection of said electrode to the outside of the tube, said lead-in means comprising two elongated molybdenum foils parallel to each other, and two molybdenum cables, each of which is welded to one end of one of said foils; said electrode comprising an electrode head consisting of sintered tungsten metal containing from about 1.8 to 5 percent by weight of thorium dioxide.

7. An electrical discharge tube for the emission of ultraviolet rays, comprising a quartz glass hull melted closed at opposite ends of the hull, a gaseous filling in the interior of the hull being under a pressure higher than atmospheric when the tube is in operation, two electrodes spaced apart from each other for the formation of a discharge arc therebetween during operation of the tube, each of said electrodes being located near one of said opposite melted ends, lead-in means melted into each of said ends for connection of said electrode to the outside of the tube, said lead-in means comprising two elongated molybdenum foils parallel to each other, and two molybdenum cables, each of which is welded to one end of one of said foils; said electrode comprising an electrode bearing pin of tungsten metal, an electrode head consisting of sintered tungsten metal containing from about 1.8 to 5 percent by weight of thorium dioxide, said electrode head being weld-connected to said pin and having a central blind bore, said pin being inserted in said bore so as to leave a free chamber therein, a sheet of thorium metal placed in said chamber, and channel means leading from said chamber to that portion of the surface of said electrode head at which said discharge arc sets in.

8. In an arrangement for effecting irradiations with ultraviolet rays, having a main circuit, a source of voltage potential, at least one resistor means, means for short circuiting part of said resistor means so as to raise the basic load applied from said source via said resistor means to said tube briefly for a time between about 0.5 and 10 seconds to a flash load equal to from 8 to 20 times the basic load, and means for automatically controlling the duration of the actuation of said short-circuiting means, said automatic controlling means being connected in parallel to said resistor means, and short-circuiting means and engaging the latter electromechanically; an ultraviolet light-emitting gas-filled high pressure discharge tube comprising an electrode head consisting of sintered tungsten metal containing from about 1.8 to 5 percent by weight of thorium dioxide; the distance between said electrodes and the extension of the discharge space in the exterior of the hull in the central transversal plane of the latter relative to the axis of the hull extending through both electrodes being so dimensioned that the tube is laid out corresponding to a mean rate of power in put calculated as an average value of the duration of flash load and the duration of continuous operation, for a minimum continuous load, while said lead-in means and electrodes are dimensioned for supporting the high intensity electrical currents flowing during the duration of said flash load.

9. The arrangement as described in claim 8, wherein said gaseous filling of said discharge tube is xenon at a pressure of about two atmospheres when the tube is in operation.

10. The arrangement as described in claim 8, wherein said gaseous filling consists of a basic filling of a noble gas of a few mm. of mercury, and mercury in amounts sufficient to produce a mercury vapor pressure ranging between about 380 mm. of mercury and 5 atmospheres.

References Cited in the file of this patent

UNITED STATES PATENTS

| | | |
|---|---|---|
| 2,145,196 | Biggs | Jan. 24, 1939 |
| 2,265,367 | Hartman | Dec. 9, 1941 |
| 2,316,566 | Constable et al. | Apr. 13, 1943 |
| 2,353,980 | Weissglass | July 18, 1944 |
| 2,477,966 | Davies et al. | Aug. 2, 1949 |
| 2,659,833 | Anderson | Nov. 17, 1953 |
| 2,727,169 | Noel | Dec. 13, 1955 |
| 2,744,013 | Willoughby | Dec. 11, 1956 |
| 2,803,775 | Jaumann | Aug. 20, 1957 |

FOREIGN PATENTS

| | | |
|---|---|---|
| 687,195 | Great Britain | Feb. 11, 1953 |